Jan. 25, 1927.
G. TASMAN
1,615,246
ADJUSTABLE SEAT FOR VEHICLES
Original Filed Jan. 13, 1925
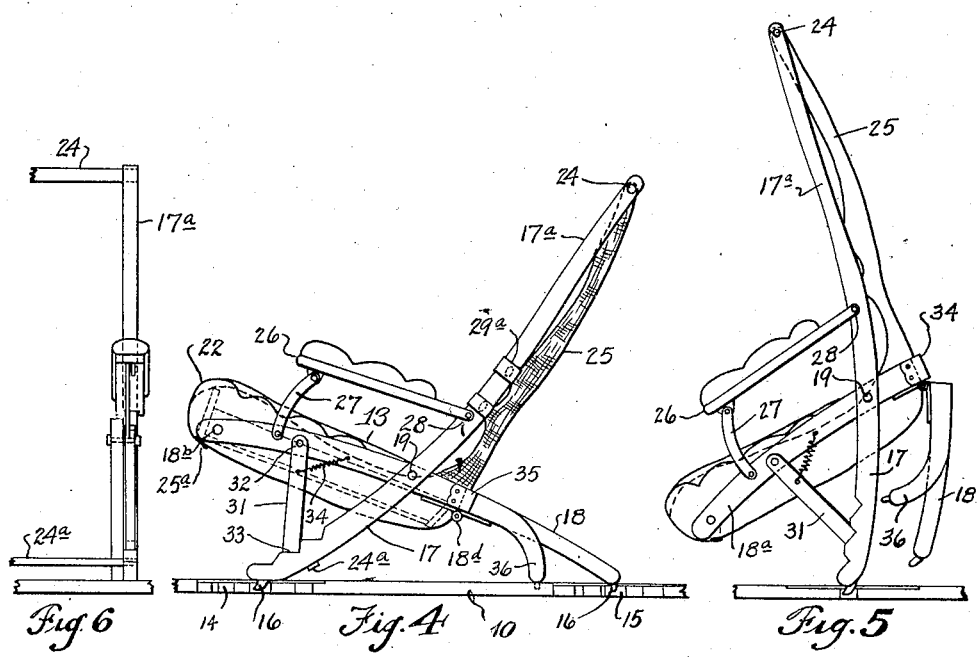
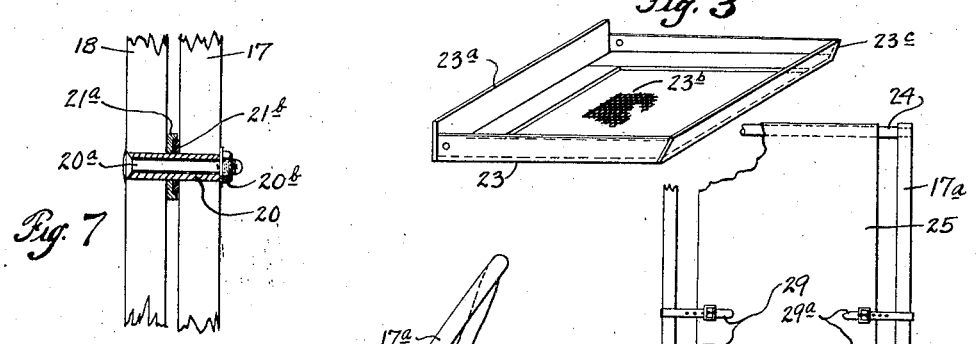
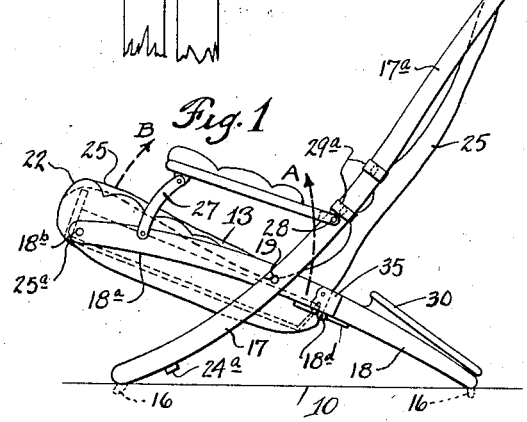
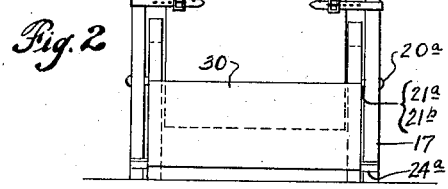
INVENTOR
George Tasman
BY Otto K. Zwiryzenberger
his ATTORNEY Patented Jan. 25, 1927.

1,615,246

UNITED STATES PATENT OFFICE.

GEORGE TASMAN, OF BROOKLYN, NEW YORK.

ADJUSTABLE SEAT FOR VEHICLES.

Original application filed January 13, 1925, Serial No. 2,073. Divided and this application filed June 4, 1925. Serial No. 35,002.

This invention relates to seats and it particularly relates to adjustable seats for vehicles used for passenger service, such as coaches, automobiles, busses and the like conveyances, the subject matter being a part of and described, but not claimed in my original co-pending application for vehicle bodies, filed under Serial No. 2,073, January 13, 1925.

The object of my invention is to provide means which will allow the passenger in a conveyance, for instance such as an automobile, greater comfort during travel by relieving them from feeling the shocks of the automobile.

It is an object of the invention to provide means which will adjust automatically to the form of a passenger and so will also contribute to the passenger's well being.

It is a further object of the invention to provide means for the accommodation of passengers during the travel in automobiles or the like conveyances, which means are arranged to make an economical use of the space inside the automobile body so as to give ample liberty of moving to and from the doors of the automobile.

It is also an object of the invention to provide means for the accommodation of passengers during the travel in automobiles, which means are adapted to be easily removed so as to have the means used outside of the automobile, for instance in camp, or for the purpose of using the automobile, after the removal of the means, for cartage.

With these and other objects in view, which will be more apparent from the following specification and claim, my invention resides in a new adjustable seat, its construction and arrangement of parts being illustrated in the accompanying drawings, in which—

Fig. 1 is a side view,

Fig. 2 is a rear view,

Fig. 3 is a view of the front part of the seat,

Figs. 4 and 5 are side views of a modified form of my new seat,

Fig. 6 is a front view of the right part of the modified form of a seat.

Fig. 7 is a detail sectional view of the pivot between the legs.

Referring to the drawings 10 denotes the bottom, or floor, of a vehicle such as an automobile (not shown), which carries the seats 13 independently and disconnectedly with any part of the body shell (not shown) whatever. To this effect the floor 10 is provided with certain recesses 14 and 15 which are adapted to receive hook-shaped projections 16, socalled "devils", provided at the lower ends of the front and rear legs 17 and 18, respectively, of the seats 13. These legs 17 and 18, preferably slightly arched, are pivoted at 19 around a tube 20 and held together by a screw threaded bolt $20^a$ slipped through said tube 20 and tightened at the other end by a nut $20^b$, a washer, consisting of a female part $21^a$ and a male part $21^b$, is interposed between said legs 17 and 18 at 19. The cushioned seat 22 is formed by a frame 23 having its front side $23^a$ project about two inches and the rear side $23^c$ slightly less upwardly and having its open middle field covered with a strip of heavy canvas $23^b$, upon which either springs are sewed on, in the manner usual for such work, or silk floss or the like material is arranged thereon in a heavy layer; after thus working up the seat in the manner known to this particular art it is finished by spreading a cover of velvet, velour or other like material over it and fixing the same to the frame 23. The outside and the edge of the front plate $23^a$ is heavily padded with silk floss and finished with the same material as the cushioned seat.

The upper parts of $17^a$ of the front legs 17 are kept together at their ends by a rail 24 and the lower parts of these legs are steadied by a rail $24^a$, Fig. 1. A wide strip of strong canvas 25 starts from and is secured below frame 23 near its front edge at $25^a$ and passes from there over the cushioned seat and the back over the rail 24 down the rear side of the back to below the cushion to the point $25^a$ where also this end of the canvas strip is secured. The canvas can be covered with any finishing material. The frame 23 is, furthermore, pivoted around a tube and held by a screwthreaded bolt, passed through said tube, at the point $18^b$, so that the frame 23 with the cushion may be tilted in a forward direction as indicated by the arrow A. This tilting is desirable to gain space when the seat 13 is to be folded in the direction of the arrow B, for the purpose of gaining space, especially to get free access to the door to enter or leave the car; this same purpose is also accomplished, as illustrated by Fig. 5, which shows the seat pushed forward, for then the lower parts of the legs 18, which are broken, and have their parts joined by a hinge 18<sup>d</sup>, swing downwardly thus rendering the rear part of the whole space formerly occupied by the open seat practically all available.

An arm rest 26 is hingedly secured at 28 to the upper part 17<sup>a</sup> of the front leg 17 and is hingedly connected with a support 27 which in turn is hingedly secured to the outer edge of parts 18<sup>a</sup>. Shortly above 26 the canvas strip 25 is provided with two parallel straps 29, which are provided with a line of holes. These straps 29 can be slung around the upper parts 17<sup>a</sup> and by means of the holes they can be fastened with the buckles 29<sup>a</sup> secured at the respective places on the rear part of the strip 25. By those straps 29, which of course can be provided with any other fastening means, the canvas strip 25 may be lengthened or drawn tighter just as the case may require to obtain that particular shape of the strip 25 which the body of the passenger needs for his comfort.

The rear legs are furthermore provided with a foot rest 30, advantageously rigidly secured thereto in such position that the foot of the passenger forms substantially an angle of 90 deg. with the lower leg of the passenger sitting on the respective rear seat. A somewhat simpler form of the seat 13 is shown by Figs. 4, 5 and 6 which form is especially characterized by a brace 31 pivoted to the front part 18<sup>a</sup> at 32 and engaging with its flat lower end the notches 33 to support the front part 18<sup>a</sup> with the seat thereon. The springs 34 hold brace 31 in place. Also in this case the leg 18 has the hinge 18<sup>d</sup> and when the back 17<sup>a</sup> of this construction is pushed forward, to stand for instance vertically, the front parts 18<sup>a</sup> are inclined and the legs 18, on account of the pivot 18<sup>d</sup>, hang down almost vertically and if then the seat is still in this direction tilted so as to stand on the devil of either the right or left front leg, the whole seat can be easily swung to render its place available. In order to give the seat as much stability as possible I provide the part 18<sup>a</sup> at its end, where the hinge 18<sup>d</sup> is provided, with a shoe 35 into which the part or rear leg 18 fits as the male part which makes this joint very strong. In regard to the foot rest I wish to state that the same may be rigidly secured to the rear leg 18 or it may be adjustably secured by providing a toothed bracket at its upper end or I may make it entirely independent of the seat 13 so as to shift it as the situation may require. As the seat is intended to give the passenger as much comfort as possible, especially also in regard to moving to and from the door, the leg 18 of the seat nearest to the door may be formed as shown by leg 36 (Fig. 4) which is bent straight downwardly so as to stand almost vertically on the floor, while the other leg of the chair may be inclined to the floor. It is of course understood that both rear legs 18 may be given the form shown by leg 36 without sacrificing any advantages, such as for instance securing the footrest 30 to such legs 36. In explanation of the advantages offered by my invention I may say that my new style of seats per se gives absolute comfort to the passenger even during the longest ride and the arrangement of the seats on the floor, without any connection whatever, with the sides of the body shell, results in the easy removal of the seats whenever it is required to make space within the car, for instance when the owner is a travelling salesman who occasionally wants to use his car for the transportation of sample trunks, or when it is necessary to use the car space for sleeping purposes, or when the chairs are simply desired, as for instance at the sea shore, in the camp for taking meals, or for resting.

What I claim is:

In an adjustable knockdown seat, adapted to be removably arranged in recessed holding means in the floor of and within the body of a vehicle, such as an automobile, without any connection to said body, the combination comprising on each side a pair of pivotally joined front legs and rear legs extending beyond the pivots, rails connecting the lower and the upper parts of the front legs extending into the back, a frame with a front wall, holding a cushioned seat, pivotally secured at the foremost point of the extension of the rear legs, a longitudinally automatically adjusting strip of canvas, covering the width of the cushioned seat, laid loosely over the seat along the front and the rear of the back and being secured with both its ends below the front wall of the frame, and adjusting means extending from the canvas strip to adapt laterally the canvas to the shape of the passenger.

Signed at New York, county and State of New York, this 29th day of May, 1925.

GEORGE TASMAN.